United States Patent
Kaji et al.

(10) Patent No.: US 10,773,532 B2
(45) Date of Patent: Sep. 15, 2020

(54) IMAGE FORMING METHOD AND IMAGE FORMING DEVICE

(71) Applicants: Yuki Kaji, Saitama (JP); Tomohiro Nakagawa, Kanagawa (JP); Hiroki Hagiwara, Kanagawa (JP)

(72) Inventors: Yuki Kaji, Saitama (JP); Tomohiro Nakagawa, Kanagawa (JP); Hiroki Hagiwara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/448,118

(22) Filed: Jun. 21, 2019

(65) Prior Publication Data

US 2019/0389231 A1  Dec. 26, 2019

(30) Foreign Application Priority Data

Jun. 26, 2018  (JP) ................. 2018-121037

(51) Int. Cl.
| | |
|---|---|
| *B41J 11/00* | (2006.01) |
| *B41M 5/00* | (2006.01) |
| *C09D 11/102* | (2014.01) |
| *C09D 11/104* | (2014.01) |
| *C09D 11/107* | (2014.01) |
| *C09D 11/322* | (2014.01) |

(52) U.S. Cl.
CPC ........ *B41J 11/0015* (2013.01); *B41M 5/0023* (2013.01); *C09D 11/102* (2013.01); *C09D 11/104* (2013.01); *C09D 11/107* (2013.01); *C09D 11/322* (2013.01)

(58) Field of Classification Search
CPC .......... B41J 11/0015; B41J 2002/14403; B41J 2202/12; B41J 2/14274; B41M 5/0023;
(Continued)

(56) References Cited

U.S. PATENT DOCUMENTS 8,845,091 B2 *  9/2014  Ohshima ................ B41M 5/502
                                                          347/105
2013/0141500 A1   6/2013  Prasad et al.

FOREIGN PATENT DOCUMENTS

| EP | 3 211 048 A1 | 8/2017 |
|---|---|---|
| JP | 2010-023266 | 2/2010 |
| JP | 2012-184334 | 9/2012 |

OTHER PUBLICATIONS

IP.com search (Year: 2020).*
(Continued)

*Primary Examiner* — Lisa Solomon
(74) *Attorney, Agent, or Firm* — Oblon, McClelland, Maier & Neustadt, L.L.P.

(57) ABSTRACT

An image forming method includes coating a non-absorptive recording medium with a pre-processing fluid containing a metal salt and a resin A; and applying a magenta ink to the non-absorptive recording medium which has been coated with the pre-processing fluid, wherein the magenta ink contains a resin B having a glass transition temperature higher than the glass transition temperature of the resin A and C.I.Pigment Red 269 represented by the following Chemical formula 1:

(Continued)

Chemical formula 1

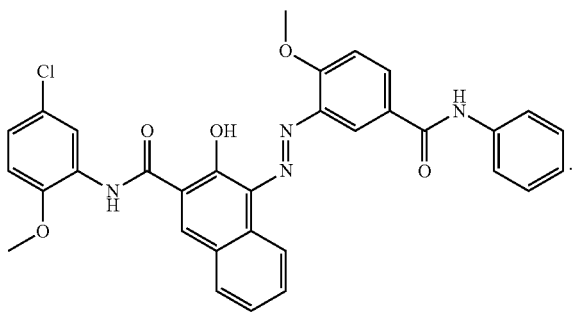

8 Claims, 11 Drawing Sheets

(58) Field of Classification Search
CPC ...... B41M 5/00; C09D 11/102; C09D 11/104; C09D 11/107; C09D 11/322; C09D 11/54; C09D 11/40; C09D 11/38
See application file for complete search history.

(56) References Cited

OTHER PUBLICATIONS

Extended European Search Report dated Nov. 13, 2019 in European Patent Application No. 19181029.0 citing documents AA and AO therein, 5 pages.

* cited by examiner

IMAGE FORMING METHOD AND IMAGE FORMING DEVICE

CROSS-REFERENCE TO RELATED APPLICATIONS

This patent application is based on and claims priority pursuant to 35 U.S.C. § 119 to Japanese Patent Application No. 2018-121037, filed on Jun. 26, 2018, in the Japan Patent Office, the entire disclosure of which is hereby incorporated by reference herein.

BACKGROUND

Technical Field

The present invention relates to an image forming method and an image forming device.

Description of the Related Art

Plastic film is widely used as packaging material for food, beverage, articles for daily used, etc., and in general, images, texts, etc., are printed on such plastic film. Plastic film is an extremely poorly water-absorptive medium. Such a medium limits the type of usable ink to, for example, a solvent-based ink in which an organic solvent is used as a solvent and an ultraviolet-curable ink in which a polymerizable monomer is a major component.

However, food, beverage, articles for daily use directly contact with humane bodies or are taken therein. Therefore, in some occasions, it is preferable to avoid using such a solvent-based ink or an ultraviolet-curable ink.

SUMMARY

According to embodiments of the present disclosure, provided is an image forming method which includes coating a non-absorptive recording medium with a pre-processing fluid containing a metal salt and a resin A; and applying a magenta ink to the non-absorptive recording medium which has been coated with the pre-processing fluid, wherein the magenta ink contains a resin B having a glass transition temperature higher than the glass transition temperature of the resin A and C.I.Pigment Red 269 represented by the following Chemical formula 1:

Chemical formula 1

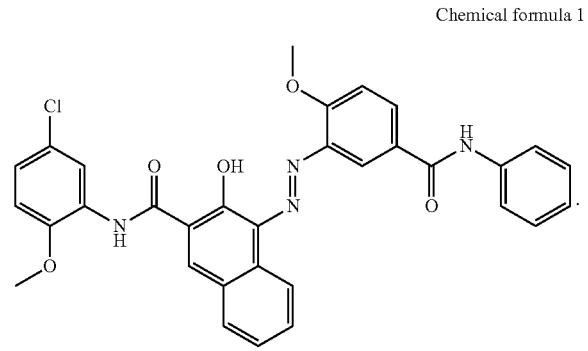 [SMILES: COc1ccc(C(=O)Nc2ccccc2)cc1/N=N/c1c(O)c(C(=O)Nc2cc(Cl)ccc2OC)cc2ccccc12]

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
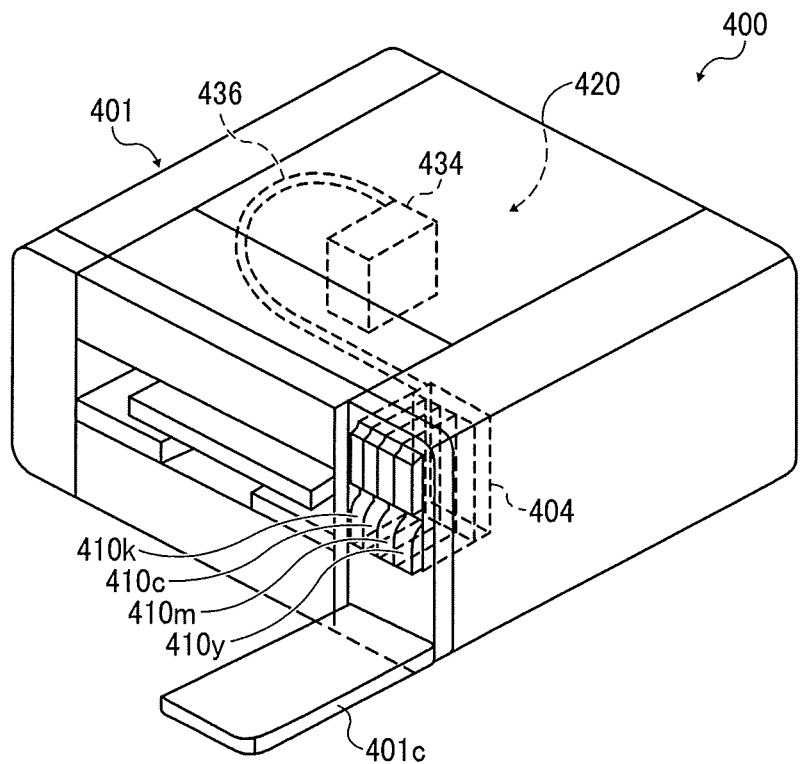
FIG. 1 is a diagram illustrating a perspective view of an example of an inkjet recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an image forming method is provided, which is capable of forming images having excellent blocking resistance on a non-absorptive recording medium while reducing occurrence of bleeding and demonstrating high level of coloring.

Aqueous ink including water as a major component is said to have minor impacts on human bodies in comparison with the solvent-based ink or the ultraviolet-curable ink. To print on a non-absorptive recording medium having extremely low water absorptivity with aqueous ink without bleeding, for example, pre-processing fluid containing a metal salt is applied in advance onto the non-absorptive recording medium before printing. Upon the application of the pre-processing fluid, a salt is formed from a metal ion and a coloring material. This salt agglomerates, which leads to formation of quality images without bleeding. For example, an inkjet recording method of applying a reaction liquid and an ink composition onto a recording medium having a low water-absorptive paper substrate having an absorption layer for printing has been proposed.

Plastic film as the non-absorptive recording medium is generally transparent, which requires a high concentration of a coloring material in ink to demonstrate coloring. However, as the concentration of a coloring material increases, the ink film tends to become brittle. Therefore, if such ink film is rolled up in a printing device for industrial use, a formed image adheres to the adjacent film due to the pressure applied by a roller and is detached from the recording medium. That is, so-called blocking tends to occur. For this reason, demonstrating high level of coloring at low coloring material concentration is required.

C.I.Pigment Red 269 is used for magenta ink as an azo pigment demonstrating a high level of coloring at a low coloring material concentration. An ink composition is has been proposed, which contains at least two types of azo pigments as the coloring materials including C.I.Pigment Red 269 as one example, a pigment dispersible resin, water, and a water-soluble solvent.

However, the proposed technologies mentioned above fail to sufficiently ameliorate brittleness of the ink film on a non-absorptive recording medium. Therefore, development of technologies capable of striking a balance between reduction of occurrence of bleeding, high level of coloring, and blocking resistance is expected.

Embodiments of the present disclosure are described in detail below.

The image forming method according to the present disclosure includes coating a non-absorptive recording medium with a pre-processing fluid containing a metal salt and a resin A and applying a magenta ink to the non-absorptive recording medium onto which the pre-processing fluid has been applied, wherein the magenta ink contains a resin B having a glass transition temperature higher than a glass transition temperature of the resin A and C.I.Pigment Red 269 represented by the following Chemical formula 1.

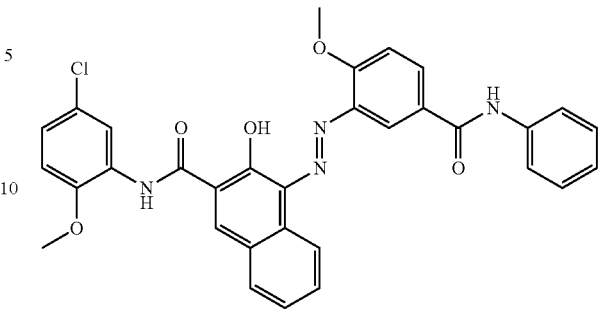

Chemical formula 1

When storing a large amount of printed matter rolled up as a roll, the image is in contact with adjacent film under a pressure. Therefore, when reeling the film from the roll, the portion of the image adhering to the film is detached, namely, blocking occurs. If coloring material concentration is increased to demonstrate good coloring, the mass of pigment particles per unit of area contained in the ink film increases. Therefore, brittle layers are easily formed, which leads to occurrence of blocking.

Pigment Red 269, which is one of azo pigments and used as a coloring material for magenta ink in the present disclosure, is found to be capable of demonstrating high level of coloring at low pigment concentration and ameliorating brittleness of ink film caused by high pigment concentration, thereby ameliorating blocking resistance. In addition, regarding the resin A in the pre-processing fluid and the resin B in the magenta ink, inclusion of the resin A and the resin B having a glass transition temperature higher than that of the resin A is found to further ameliorate blocking resistance. This improvement of blocking resistance is inferred to be caused by a combination of the following 1 and 2:1. an addition of a resin having a low glass transition temperature to a pre-processing fluid forms a relatively flexible pre-processing layer, which serves like a cushion to a layer formed thereon; and 2. an addition of a resin having a high glass transition temperature to magenta ink makes the entire ink layer a uniform and strong resin-like film, which prevents loss of the ink layer.

Pre-Processing Fluid

The pre-processing fluid in the present disclosure contains at least a metal salt and the resin A and furthermore water. The pre-processing fluid may furthermore optionally contain an organic solvent, a surfactant, a defoaming agent, a preservatives and fungicides, and a corrosion inhibitor, which may be contained in the magenta ink described later.

The method of coating a recording medium with the pre-processing fluid is not particularly limited and any known method can be used without limitation.

Specific examples of such recording methods include, but are not limited to, an inkjet method, a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro gravure coating method, a reverse roll coating method, a four roll coating method, a five roll coating method, a dip coating method, a curtain coating method, a slide coating method, and a die coating method.

Also, the amount of coating a recording medium with the pre-processing fluid is, for example, from 0.1 to 10 g/m² and preferably from 1 to 6 g/m².

Metal Salt

The metal salt contained in the pre-processing fluid causes the coloring material in the ink to quickly agglomerate after the ink droplet lands on the recording medium, thereby reducing color bleeding and improving coloring.

The metal salt is not particularly limited. To further reduce bleeding by stronger agglomeration of the coloring material, multivalent metal salts are preferable.

Specific examples of the metal in the multivalent metal salt include, but are not limited to, titanium, chromium, copper, cobalt, strontium, barium, iron, aluminum, calcium, magnesium, etc. Of these, calcium and magnesium are preferable from the viewpoint of effective agglomeration of the coloring material.

Specific examples of multi-valent metal salts include, but are not limited to, calcium carbonate, calcium nitrate, calcium chloride, calcium acetate, calcium sulfate, magnesium chloride, magnesium acetate, magnesium sulfate, barium sulfate, zinc sulfide, zinc carbonate, aluminum silicate, calcium silicate, silica gel magnesium, and aluminum hydroxide.

The concentration of the metal salt in the pre-processing fluid is, for example, from 0.01 to 0.1 mol/kg and preferably from 0.05 to 0.5 mol/kg to the total amount of the pre-processing fluid.

Resin A

The resin A contained in the pre-processing fluid is preferably nonionic resin particles. Nonionic resin particles can be dispersed by steric repulsion without using charges by neutralization of acidic or basic functional groups.

The structure of the nonionic resin particle is not particularly limited. Resin particles which can be nonion-dispersed can be used. When the resin particle is at least a member selected from the group consisting of a polyolefin resin, a polyvinyl acetate resin, a polyvinyl chloride resin, a urethane resin, and a copolymer of these resins, these are preferable to obtain strong attachability to various recording medium. Moreover, a copolymer resin of ethylene-vinyl acetate, a copolymer resin of ethylene-vinyl acetate-vinyl chloride, an olefin-modified urethane resin, a polyester-based urethane resin, a polycarbonate-based urethane resin, and a polyether-based urethane resin are more preferable.

The glass transition temperature of the resin A is preferably from −30 to 30 degrees C. When the glass transition temperature is −30 degrees C. or higher, the resin film becomes sufficiently tough and a pre-processing layer formed on a recording medium by the pre-processing fluid becomes more robust. When 30 degrees C. or lower, filming property of the resin is enhanced and sufficient flexibility is secured, thereby enhancing attachment to a substrate. In the present disclosure, the glass transition temperature is preferably 0 degrees C. or less and more preferably −30 degrees C. to 0 degrees C. in order to form a more flexible pre-processing layer.

The glass transition temperature in the specification can be measured by, for example, a differential scanning calorimeter (DSC) (Thermo plus EVO2/DSC, manufactured by Rigaku Corporation) at the measurement temperature of from 30 to 300 degrees C. at a temperature rising speed of 2.5 degrees C. per minute.

The volume average particle diameter (hereinafter also referred to as average particle diameter) of the resin A is preferably 1000 nm or less and more preferably from 10 to 200 nm. The volume average particle diameter may be determined using, for example, a particle size measuring device (Multi sizer III, manufactured by Beckman Coulter, Inc.) and analysis software (Beckman Coulter Mutlisizer 3 version 3.51) installed thereonto.

The proportion of the resin A in the pre-processing fluid is preferably from 0.5 to 20 percent by mass and more preferably from 1 to 15 percent by mass.

When the proportion of the resin A is 0.5 percent by mass or more, the resin A can sufficiently cover the surface of the recording medium, so that the attachability of the pre-processing fluid is improved. When the proportion is 20 percent by mass or less, an increase in the film thickness of the pre-processing fluid can be avoided, thereby preventing deterioration of attachability.

Magenta Ink

The ink of the present disclosure contains C.I.Pigment Red 269 represented by Chemical formula 1 and the resin B having a glass transition temperature higher than that of the resin A and optionally water. The ink may further optionally contain an organic solvent, a surfactant, a defoaming agent, a preservative and fungicide, a corrosion inhibitor, etc.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

C.I.Pigment Red 269

The proportion of C.I.Pigment Red 269 in the ink is preferably from 0.1 to 10 percent by mass, more preferably from 0.1 to 6 percent by mass, and furthermore preferably from 0.1 to 6 percent by mass in terms of improvement of the image density, good fixability and discharging stability, and brittleness of the ink film.

Hereinafter, C.I. Pigment Red 269 is also referred to as pigment.

To obtain an ink by pigment dispersion, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as a sulfone group and a carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Resin B

The resin B contained in the magenta ink is not particularly limited as long as the resin B has a glass transition temperature higher than that of the resin A. Preferably, the resin B is an acrylic-based resin particle. The acrylic-based resin particle affects smoothness and transparency of the ink film, which has an impact on saturation and bleeding reduction. It is also effective to improve the strength of the ink film. Examples of the acrylic-based resin include, but are not limited to, an acrylic resin, a styrene-acrylic resin, and a cross-linked styrene-acrylic resin.

The glass transition temperature of the resin B is required to be higher than the glass transition point of the resin A. From a viewpoint of the improvement of the present disclosure and ink film strength improvement at room temperature storage of printed matter, the glass transition temperature is preferably 50 degrees C. or higher and more preferably from 50 to 100 degrees C. In addition, the difference between the glass transition temperature of the resin A and the glass transition temperature of the resin B is preferably from 10 to 100 degrees C. and more preferably from 50 to 100 degrees C.

The resin B preferably has a volume average particle diameter of 1000 nm or less and more preferably from 10 to 200 nm. The volume average particle diameter may be determined using, for example, a particle size measuring device (Multisizer III, manufactured by Beckman Coulter, Inc.) and analysis software (Beckman Coulter Mutlisizer 3 version 3.51) installed thereonto.

It is possible to use a suitably-synthesized resin particle as the resin B. Alternatively, the resin particle available on the market can be used.

Specific examples of the resin B available on the market include, but are not limited to, Microgel E-1002 and E-5002 (styrene-acrylic-based resin particulates, manufactured by Nippon Paint co., Ltd.), Voncoat 4001 (acrylic-based resin particulates, manufactured by Dainippon Ink and Chemicals, Inc.), Voncoat 5454 (styrene/acrylic-based resin particulates, manufactured by Dainippon Ink and Chemicals, Inc.), SAE-1014 (styrene-acrylic-based resin particulates, manufactured by Nippon Zeon Co., Ltd.), Saivinol SK-200 (acrylic-based resin particulates, manufactured by Saiden Chemical Industry Co., Ltd.), Primal AC-22 and AC-61 (acrylic-based resin particulates, manufactured by The Dow Chemical Company), and NANOCRYL SBCX-2821 and 3689 (acrylic-silicone-based resin particulates, manufactured by Toyo Ink Co., Ltd.).

The proportion of the solid content of the resin B in the magenta ink is preferably from 0.5 to 20 percent by mass and more preferably from 1 to 15 percent by mass.

When the proportion of the resin B is 0.5 percent by mass or more, a sufficient amount of the resin B is secured, a flat film is formed. When the proportion is 20 percent by mass or less, the resin film transparency is secured and ink coloring ameliorates.

Organic Solvent

There is no specific limitation to the organic solvent for use in the present disclosure. For example, water-soluble organic solvents can be used. Examples include, but are not limited to, polyols, ethers such as polyol alkylethers and polyol arylethers, nitrogen-containing heterocyclic compounds, amides, amines, and sulfur-containing compounds.

Specific examples include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethyl ether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, E-caprolactam, and y-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

The proportion of the organic solvent in the ink has no particular limit and can be suitably selected to suit to a particular application.

In terms of drying property and discharging reliability of ink, the proportion is preferably from 10 to 60 percent by mass and more preferably from 20 to 60 percent by mass.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, preferred are silicone-based surfactants which are not decomposed even in a high pH environment. Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

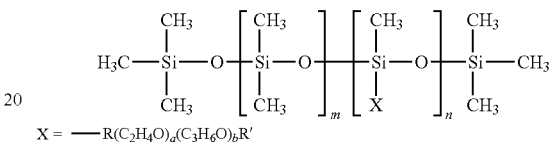

$X = \text{—}R(C_2H_4O)_a(C_3H_6O)_bR'$

In Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable.

Chemical formula F-1

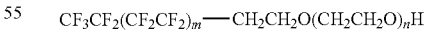

In the compound represented by Chemical formula F-1, m is preferably 0 or an integer of from 1 to 10 and n is preferably 0 or an integer of from 1 to 40.

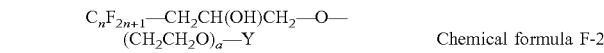

In the compound represented by the chemical formula F-2, Y represents H or $C_mF_{2m+1}$, where m represents an integer of from 1 to 6, or $CH_2CH(OH)CH_2\text{—}C_mF_{2m+1}$, where m represents an integer of from 4 to 6, or $C_pH_{2p+1}$, where p is an integer of from 1 to 19. "n" represents an integer of from 1 to 6. "a" represents an integer of from 4 to 14.

As the fluorochemical surfactant, products available on the market may be used. Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation.

Specific examples include, but are not limited to, acid sulfites and sodium thiosulfates.

pH Regulator

The pH regulator has no particular limit as long as it can control pH to not lower than 7.

Specific examples include, but are not limited to, amines such as diethanol amine and triethanol amine.

Non-Absorptive Recording Medium

The non-absorptive recording medium in the present disclosure has a surface with low moisture permeability, absorbency, and/or adsorptivity and contains a material having myriad of hollow spaces inside but not open to the exterior.

To be more quantitative, the non-permeable recording medium has a water-absorption amount of 10 mL/m$^2$ or less between the initiation of contact and 30 msec$^{1/2}$ thereafter according to Bristow method.

Examples of the non-absorptive recording medium include, but are not limited to, plastic substrates such as polypropylene film, polyethylene terephthalate film, and nylon film.

Specific examples of the polypropylene film include, but are not limited to, P-2002, P-2161, P-4166, all manufactured by TOYOBO CO., LTD., PA-20, PA-30, and PA-20W, all manufactured by SunTox Co., Ltd., and FOA, FOS, and FOR, all manufactured by FUTAMURA CHEMICAL CO., LTD.

Specific examples of the polyethylene terephthalate film include, but are not limited to, E-5100 and E-5102, both manufactured by TOYOBO CO., LTD., P60 and P375, both manufactured by Toray Industries, Inc., and G2, G2P2, K, and SL, all manufactured by Teijin Dupont Film Japan Limited.

Specific examples of the nylon film include, but are not limited to, HARDEN film N-1100, N-1102, and N-1200, all manufactured by TOYOBO CO., LTD., and ON, NX, MS, and NK, all manufactured by UNITIKA LTD.

In addition to the plastic substrates, inorganic substrates such as glass, metal, ceramic, etc. may be used, and further, these single materials or a combination of plural kinds of materials may be used.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing liquids, etc., to a recording medium and a method of recording utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc., in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll-like form as a recording medium.

Figure 2:
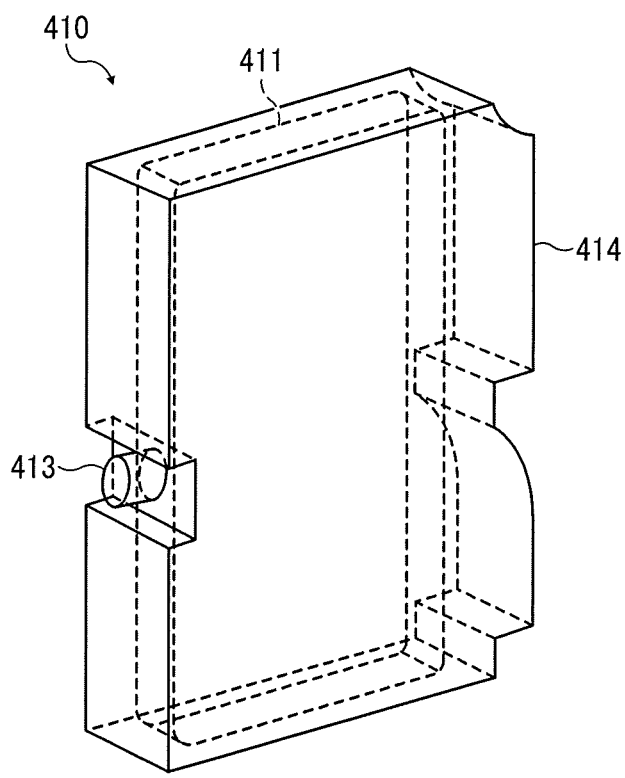
FIG. 2 is a diagram illustrating a perspective view of an example of a main tank of an inkjet recording device.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit 411 of each main tank 410 (410k, 410c, 410m, and 410y) for each color of black (K), cyan (C), magenta (M), and yellow (Y) is made of, for example, a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

This recording device may include not only a portion to discharge ink but also a device referred to as a pre-processing device, a post-processing device, etc.

As an example of the pre-processing device and the post-processing device, like black (K), cyan (C), magenta (M), and yellow (Y) ink as in the case of the ink, the pre-processing device and the post-processing device may further include a liquid accommodating unit including a pre-processing fluid or a post-processing fluid and a liquid discharging head to discharge the pre-processing fluid or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

How to use the ink is not limited to the inkjet recording method. Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

The image forming device of the present disclosure includes a coating device configured to coat a non-absorptive recording medium with a pre-processing fluid containing a metal salt and a resin A and an ink discharging head configured to discharge a magenta ink to the non-absorptive recording medium which has been coated with the pre-processing fluid, wherein the magenta ink contains a resin B having a glass transition temperature higher than the glass transition temperature of the resin A, wherein C.I.Pigment Red 269 represented by the Chemical formula 1 illustrated above.

In addition, the ink discharging head includes a nozzle through which the magenta ink is discharged, an individual liquid chamber communicating with the nozzle, a common liquid chamber configured to supply the magenta ink to the individual liquid chamber, a circulation flow path communicating with the individual liquid chamber, a circulation common liquid chamber communication with the circulation flow path, and a pressure generating device configured to apply a pressure to the magenta ink in the individual liquid chamber.

Due to an image forming device having such an ink circulation system, good discharging stability can be obtained even for printing with an ink having a resin for a long time.

For example, the ink discharging head of the present disclosure may use the following.

Figure 3:
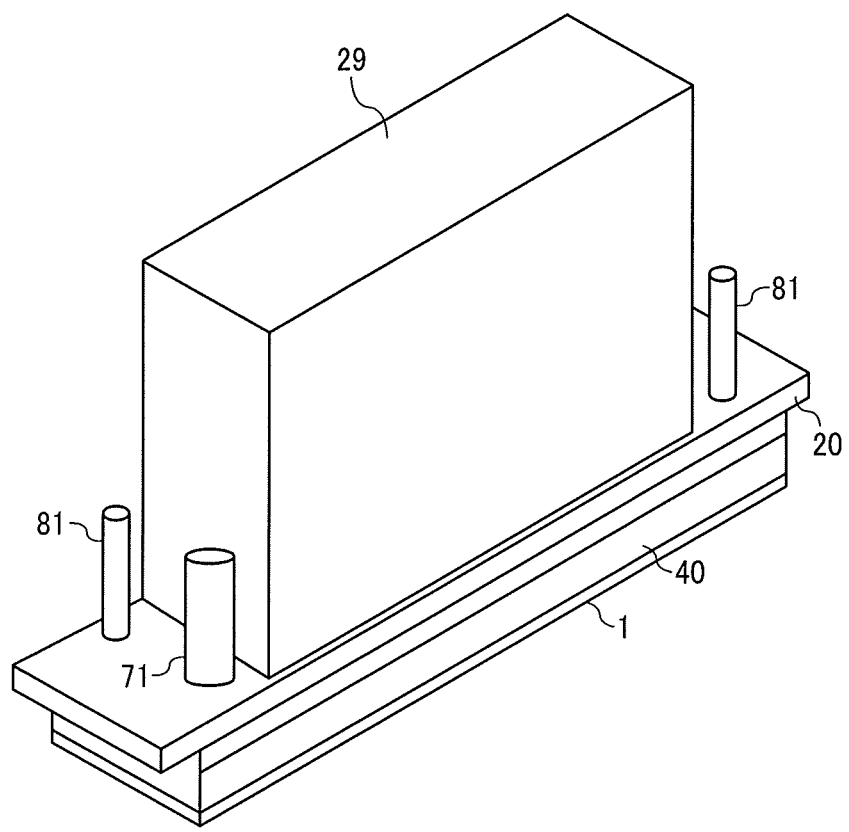
FIG. 3 is a diagram illustrating a perspective view of the outlook of an example of the ink discharging head of the printing device.
Figure 4:
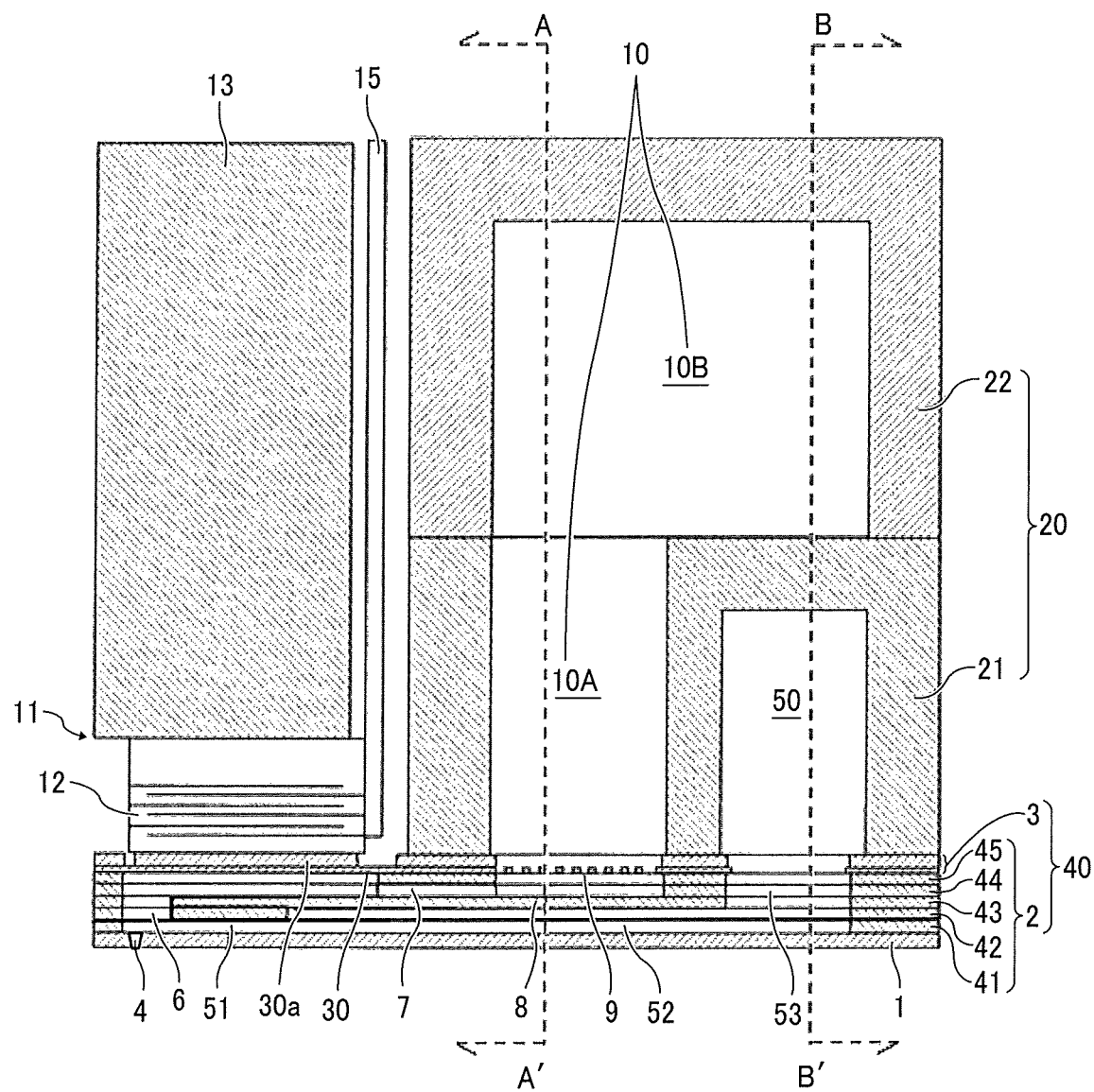
FIG. 4 is a diagram illustrating a cross section in a direction orthogonal to the nozzle arrangement direction of the ink discharging head illustrated in FIG. 3.
Figure 5:
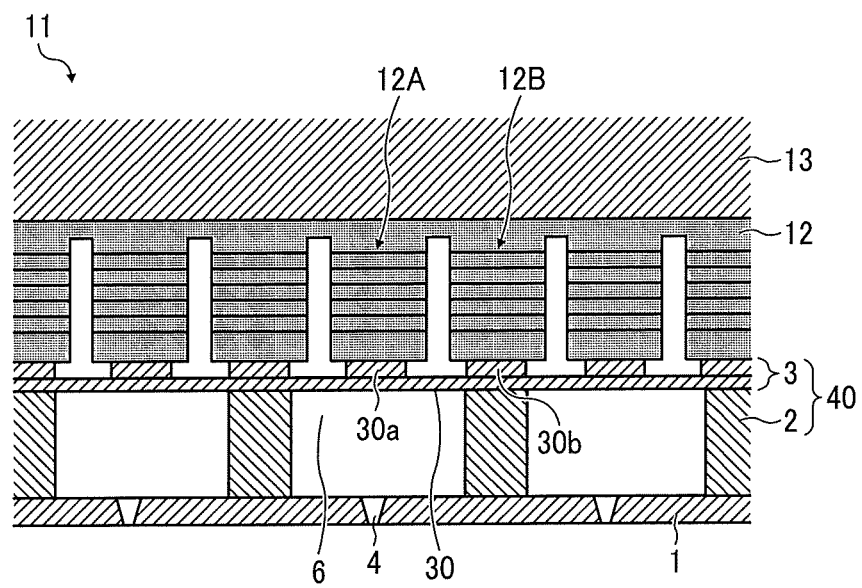
FIG. 5 is a diagram illustrating a partial cross section in a direction parallel to the nozzle arrangement direction of the ink discharging head illustrated in FIG. 3.
Figure 6:
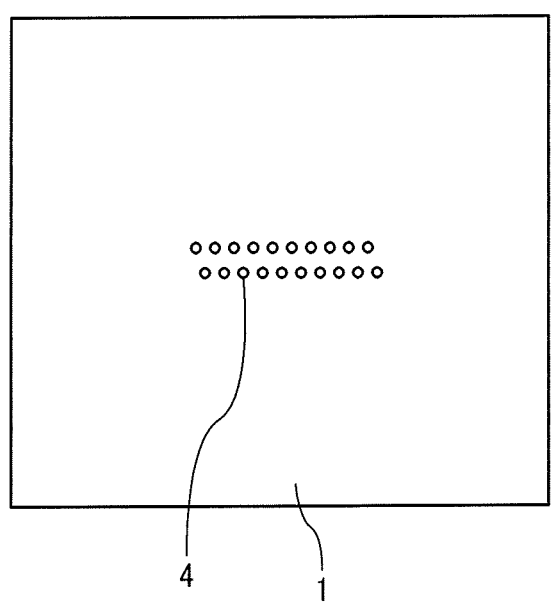
FIG. 6 is a diagram illustrating a planar view of the nozzle plate of the ink discharging head illustrated in FIG. 3.

An example will be described with reference to FIGS. 3, 4, 5, 6, 7A to 7F, 8A and 8B. FIG. 3 is a diagram illustrating a perspective view of the outlook of an example of the ink discharging head of the inkjet printing device of the present disclosure. FIG. 4 is a diagram illustrating a cross section in a direction orthogonal to the nozzle arrangement direction of the ink discharging head illustrated in FIG. 3. FIG. 5 is a diagram illustrating a partial cross section in a direction parallel to the nozzle arrangement direction of the ink discharging head illustrated in FIG. 3. FIG. 6 is a diagram illustrating a planar view of the nozzle plate of the ink discharging head illustrated in FIG. 3. FIGS. 7A to 7F are diagrams illustrating a planar view of each member constituting the flow path of the discharging head illustrated in FIG. 3. FIGS. 8A and 8B are diagrams illustrating a planar view of each member constituting the common liquid chamber of the discharging head illustrated in FIG. 3.

Also, the ink discharging head includes a nozzle plate 1, a flow path plate 2, and a diaphragm member 3 as a wall member, which are laminated and attached to each other. Also, the ink discharging head includes a piezoelectric actuator 11 to displace the diaphragm member 3, a common liquid chamber member 20, and a cover 29.

The nozzle plate 1 includes multiple nozzles 4 to discharge the ink. The flow path plate 2 forms the individual liquid chamber 6 communicating with the nozzle 4, the fluid resistance 7 communicating with the individual liquid chamber 6 as the flow-in path, and the liquid introducing portion 8 communicating with the fluid resistance 7. In addition, the flow path plate 2 is formed of a plurality of plate-like members 41 to 45 laminated and jointed to each other from the side of the nozzle plate 1. These plate-like members 41 to 45 and the diaphragm member 3 are laminated and attached to each other to form a flow path member 40.

The diaphragm member 3 includes a filter portion 9 as an orifice causing the liquid introducing portion 8 to communicate with a common liquid chamber 10 formed of the common liquid chamber member 20.

The diaphragm member 3 is a wall surface member forming the wall surface of the individual liquid chamber 6 of the flow path plate 2. This diaphragm member 3 has a double layer structure (but not limited thereto) formed of a first layer forming a thin portion and a second layer forming a thick portion from the side of flow path plate 2. The first layer forms a transformable vibration area 30 at the site corresponding to the individual liquid chamber 6.

The nozzle plate 1 includes multiple nozzles 4 disposed in a zigzag manner as illustrated in FIG. 6.

Figure 7A:
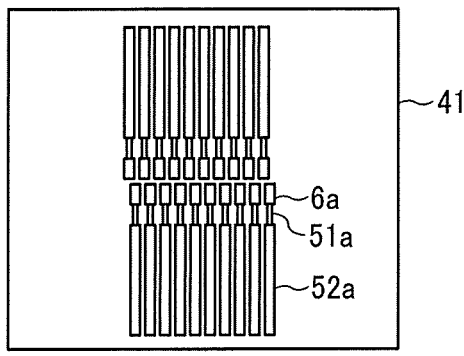
FIGS. 7A to 7F are diagrams illustrating planar views of individual members constituting a flow path member of the ink discharging head illustrated in FIG. 3.
Figure 8A:
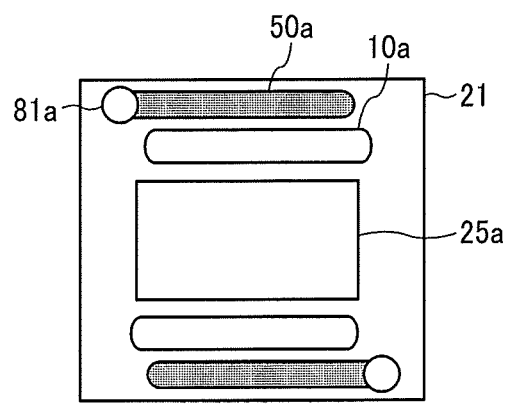
FIGS. 8A and 8B are diagrams illustrating planar views of individual members constituting a common liquid chamber member of the ink discharging head illustrated in FIG. 3.
Figure 8B:
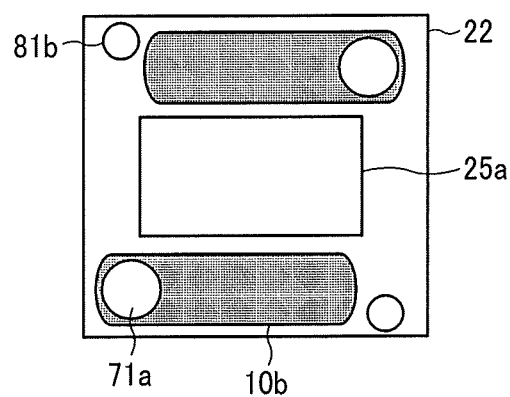

On the plate-like member 41 forming the flow path plate 2, a through-hole groove portion 6a (through hole having a groove-like form) constituting the individual liquid chamber 6, and through hole groove portions 51a and 52a constituting the fluid resistance 51 and the circulation flow path 52 as the flow-out path are formed as illustrated in FIG. 7A.

Figure 7B:
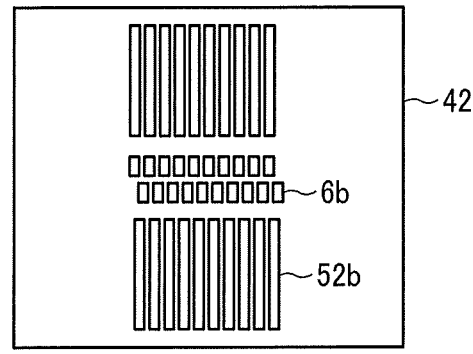

Similarly, on the plate-like member 42, a through-hole groove portion 6b constituting the individual liquid chamber 6 and a through hole groove portion 52b constituting the circulation flow path 52 are formed as illustrated in FIG. 7B.

Figure 7C:
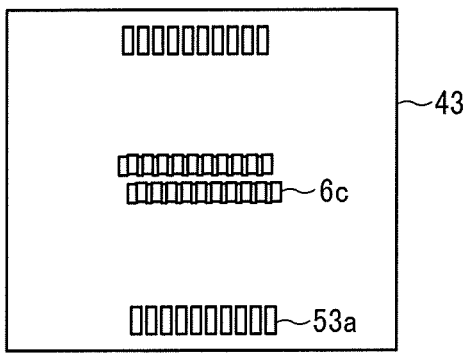

Similarly, on the plate-like member 43, a through-hole groove portion 6*c* constituting the individual liquid chamber 6 and a through hole groove portion 53*a* constituting a circulation flow path 53 with the nozzle disposition direction along the longitudinal direction are formed as illustrated in FIG. 7C.

Figure 7D:
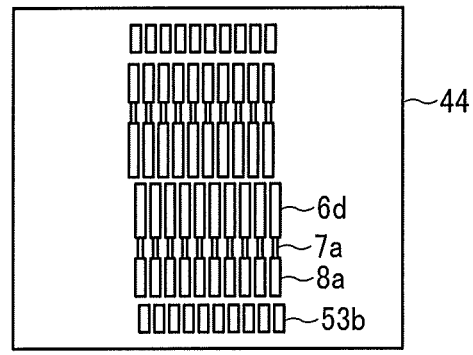

Similarly, on the plate like member 44, a through-hole groove portion 6*d* constituting the individual liquid chamber 6, a through-hole groove portion 7*a* constituting the fluid resistance 7, a through-hole groove portion 8*a* constituting the liquid introducing portion 8, and a through-hole groove portion 53*b* constituting the circulation flow path 53 with the nozzle disposition direction along the longitudinal direction are formed as illustrated in FIG. 7D.

Figure 7E:
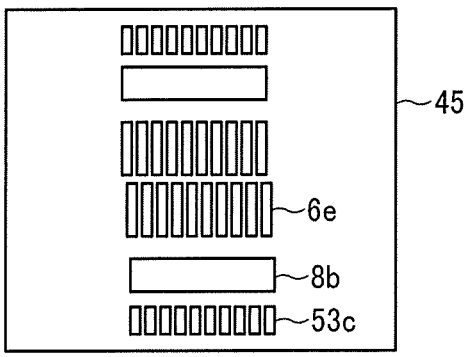

Similarly, on the plate-like member 45, a through-hole groove portion 6*e* constituting the individual liquid chamber 6, a through-hole portion 8*b* (forming a liquid chamber on the downstream of the filter) constituting the liquid introducing portion 8 with the nozzle disposition direction along the longitudinal direction, and a through-hole groove portion 53*c* constituting a circulation flow path 53 with the nozzle disposition direction along the longitudinal direction are formed as illustrated in FIG. 7E.

Figure 7F:
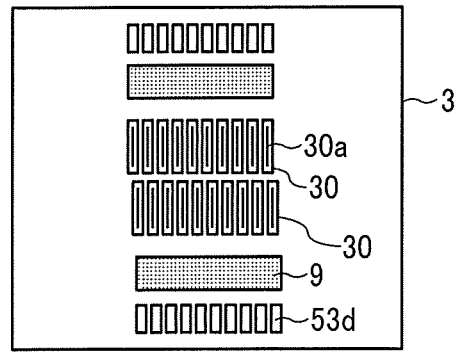

Similarly, on the plate like member 3, the vibration area 30, the filter portion 9, and a through-hole groove portion 53*d* constituting the circulation flow path 53 with the nozzle disposition direction along the longitudinal direction are formed as illustrated in FIG. 7F.

Such a simple configuration having the flow path member constituted of laminated and jointed multiple plate-like members can form complicated flow paths.

According to this configuration, on the flow path member 40 formed of the flow path plate 2 and the diaphragm member 3, the fluid resistance 51 along the surface direction of the flow path plate 2 communicating with each of the individual liquid chambers 6, the circulation flow path 52, and the circulation flow path 53 disposed along the thickness direction of the flow path member 40 communicating with the circulation flow path 52 are formed. The circulation flow path 53 communicates with a circulation common liquid chamber 50, which is described later.

The common liquid chamber member 20 includes the common liquid chamber 10 and the circulation common liquid chamber 50 to which the ink is supplied from the main tank and the ink cartridge.

As illustrated in FIG. 8A, on a first common liquid chamber member 21, there are formed a through-hole 25*a* for piezoelectric actuator, a through-hole groove portion 10*a* constituting a common liquid chamber 10A on the downstream side, and a groove portion 50*a* with a basement, which constitutes the circulation common liquid chamber 50.

As illustrated in FIG. 8B, on a second common liquid chamber member 22, there are formed a through hole 25*b* for piezoelectric actuator and a groove portion 10*b* constituting a common liquid chamber 10B on the upstream. In addition, as illustrated in FIG. 3, on the second common liquid chamber member 22, there are formed a through hole 71*a* as a supplying opening communicating one end of the common liquid chamber 10 in the nozzle arrangement direction with a supply port 71.

On the first common liquid chamber member 21 and the second common liquid chamber member 22, there are formed through-holes 81*a* and 81*b* communicating the other end (the end on the opposite side of the through-hole 71*a*) of the circulation common liquid chamber 50 in the nozzle arrangement direction with a circulation port 81.

Note that, in FIGS. 8A and 8B, the groove portion with a basement is illustrated in solid (this applies to the drawings below).

The common liquid chamber member 20 is constituted of the first common liquid chamber member 21 and the second common liquid chamber member 22. The first common liquid chamber member 21 is jointed to the flow path member 40 on the side of the diaphragm member 3 and the second common liquid chamber member 22 is laminated and jointed to the first common liquid chamber member 21.

The first common liquid chamber member 21 forms a common liquid chamber 10A on the downstream side, which partially constitutes the common liquid chamber 10 communicating with the liquid introducing portion 8 and the circulation common liquid chamber 50 communicating with the circulation flow path 53. In addition, the second common liquid chamber member 22 forms the common liquid chamber 10B on the upstream side, which constitutes the rest of the common liquid chamber 10.

The common liquid chamber 10A on the downstream side forming a part of the common liquid chamber 10 and the circulation common liquid chamber 50 are disposed side by side in the direction orthogonal to the nozzle arrangement direction. Also, the circulation common liquid chamber 50 is disposed at the position projected in the common liquid chamber 10.

Due to this, the dimension (size) of the circulation common liquid chamber 50 obtains freedom of designing from the dimension required for the flow paths including the individual liquid chamber 6, the fluid resistance 7, and the liquid introducing portion 8 formed of the flow path member 40.

Moreover, since the circulation common liquid chamber 50 and a part of the common liquid chamber 10 are disposed side by side and the circulation common liquid chamber 50 is positioned in the projection thereof in the common liquid chamber 10, the width of the head along the direction orthogonal to the nozzle arrangement direction can be reduced, thereby preventing a size increase of the head. The common liquid chamber member 20 includes the circulation common liquid chamber 50 and the common liquid chamber 10 to which the ink is supplied from the head tank or the ink cartridge.

On the opposite side of the diaphragm member 3 regarding the individual liquid chamber 6, there is disposed the piezoelectric actuator 11 including an electromechanical transducer element as a driving device (e.g., actuator, pressure generator) to transform the vibration area 30 of the diaphragm member 3.

As illustrated in FIG. 5, this piezoelectric actuator 11 includes a piezoelectric member 12 jointed onto a base member 13. The piezoelectric member 12 is grooved by half cut dicing and a particular number of piezoelectric elements 12A and 12B having a columnar form are formed on the single piezoelectric member 12 in a pectinate manner spaced a predetermined distance therebetween.

Although the piezoelectric element 12A of the piezoelectric member 12 is used as a piezoelectric element driven by a drive waveform and the piezoelectric element 12B of the piezoelectric member 12 is used as a simple supporting column without an application of a drive waveform, all of the piezoelectric elements 12A and the piezoelectric elements 12B can be used as piezoelectric elements driven by drive waveforms.

The piezoelectric element 12A is jointed to a convex portion 30*a*, which is a thick part having an island-like form formed on the vibration area 30 of the diaphragm member 3.

The piezoelectric element 12B is jointed to a convex portion 30b, which is a thick part of the diaphragm member 3.

This piezoelectric member 12 is formed by alternately laminating piezoelectric layers and inner electrodes. Each of the inner electrodes is pulled out to the exterior to provide outer electrodes, to which flexible wiring members 15 is connected.

In the ink discharging head having such a configuration, for example, the piezoelectric element 12A shrinks when the voltage applied to the piezoelectric element 12A is lowered from a reference voltage. For this reason, the vibration area 30 of the diaphragm member 3 is lowered, thereby inflating the volume of the individual liquid chamber 6, so that the ink flows into the individual liquid chamber 6.

Thereafter, the piezoelectric element 12A is elongated in the lamination direction by raising the voltage applied to the piezoelectric element 12A to transform the vibration area 30 of the diaphragm member 3 toward the nozzle 4 direction, thereby reducing the volume of the individual liquid chamber 6. As a result, the ink in the individual liquid chamber 6 is under pressure, so that the ink is discharged from the nozzle 4.

Thereafter, the voltage applied to the piezoelectric element 12A is returned to the reference voltage. Accordingly, the vibration area 30 of the diaphragm member 3 is back to the initial position so that the individual liquid chamber 6 inflates, which generates a negative pressure. At this point in time, the ink is supplied from the common liquid chamber 10 to the individual liquid chamber 6. After the vibration of the meniscus surface of the nozzle 4 decays and becomes stable, the system starts operations to discharge next droplets.

The drive method of the head is not limited to the above-mentioned (pull-push discharging). The way of discharging changes in accordance with how a drive waveform is provided, and pull discharging or push discharging is possible. In addition, in the embodiment described above, the laminated piezoelectric member is used as a device to cause a pressure change to the individual liquid chamber 6 but not limiting. For example, a piezoelectric member having a thin film can be used. Moreover, it is also possible to use a heat element which is disposed in the individual liquid chamber 6 and generates heat to produce air bubbles to change the pressure or an element causing a pressure change utilizing the electrostatic force.

Next, an example of the ink circulating system using the ink discharging head relating to the embodiment is described with reference to FIG. 9.

Figure 9:
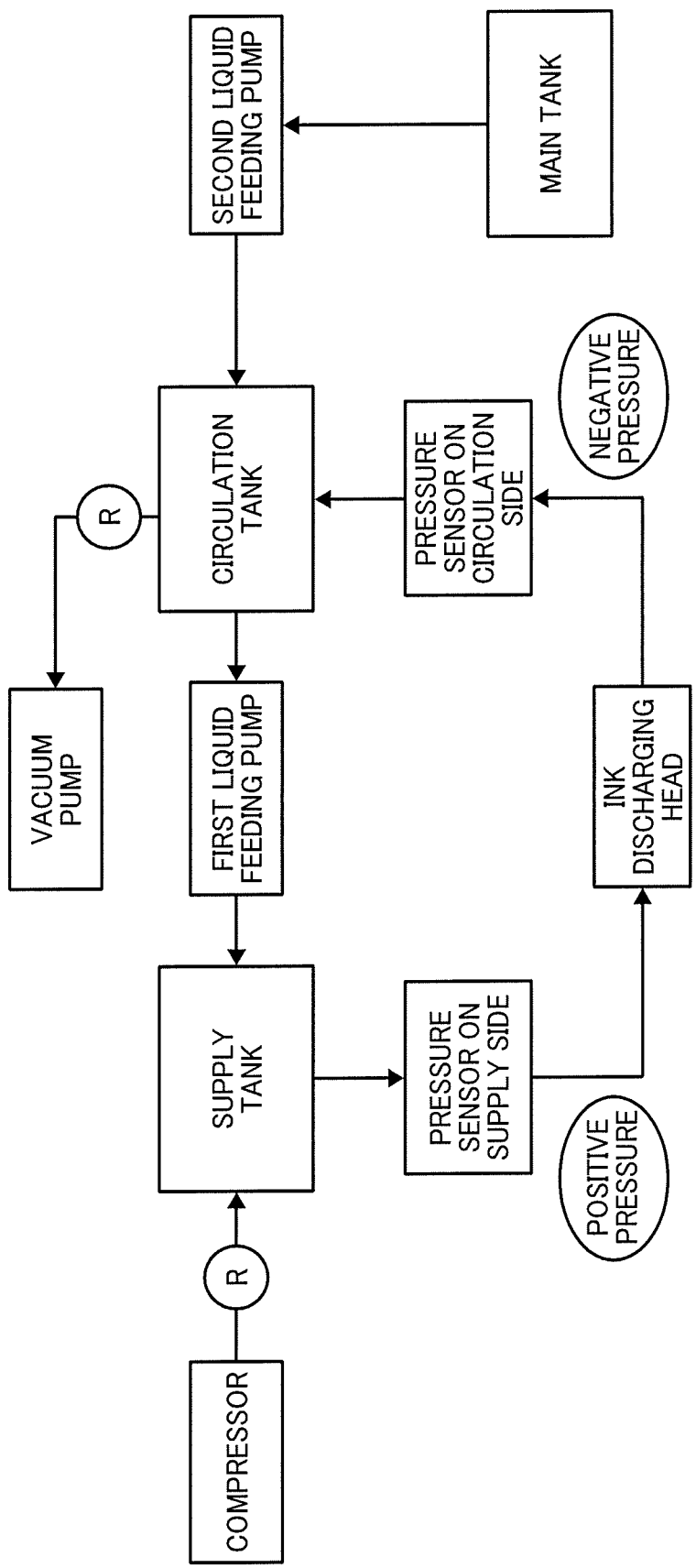
FIG. 9 is a block diagram illustrating an example of the ink circulation system relating to the present disclosure.

FIG. 9 is a block diagram illustrating an example of the ink circulation system relating to the present disclosure.

As illustrated in FIG. 9, the ink circulation system includes a main tank, an ink discharging head, a supply tank, a circulation tank, a compressor, a vacuum pump, a first liquid feeding pump, a second liquid feeding pump, a regulator (R), a pressure sensor on the supply side, a pressure sensor on the circulation side, etc. The pressure sensor on the supply side is disposed between the supply tank and the ink discharging head and connected on the supply flow path side connected to the supply port 71 (FIG. 3) of the ink discharging head. The pressure sensor on the circulation side is disposed between the ink discharging head and the circulation tank and connected to the circulation flow path side connected with the circulation port 81 (FIG. 3) of the ink discharging head.

One end of the circulation tank is connected with the supply tank via the first liquid feeding pump and, the other end, with the main tank via the second liquid feeding pump.

Due to this configuration, the ink flows from the supply tank into the ink discharging head through the supply port 71 and ejected through the circulation port to the circulation tank. Furthermore, the ink is sent from the circulation tank to the supply tank by the first liquid feeding pump for circulation.

In addition, a compressor is connected with the supply tank, which is controlled to detect a predetermined positive pressure by the pressure sensor on the supply side. In addition, a vacuum pump is connected with the circulation tank, which is controlled to detect a predetermined negative pressure by the pressure sensor on the circulation side. Therefore, the negative pressure of the meniscus can be maintained constant while circulating the ink through the ink discharging head.

In addition, as the liquid droplet is discharged from the nozzle of the ink discharging head, the amount of the ink in the supply tank and the circulation tank decreases. Therefor, it is desirable to replenish the ink from the main tank to the circulation tank using the second liquid feeding pump on suitable occasions. When to replenish the ink from the main tank to the circulation tank can be controlled based on the detection result of, for example, a liquid surface sensor disposed in the circulation tank to replenish the ink when the liquid surface height of the ink in the circulation tank becomes lower than a predetermined height.

Figure 10:
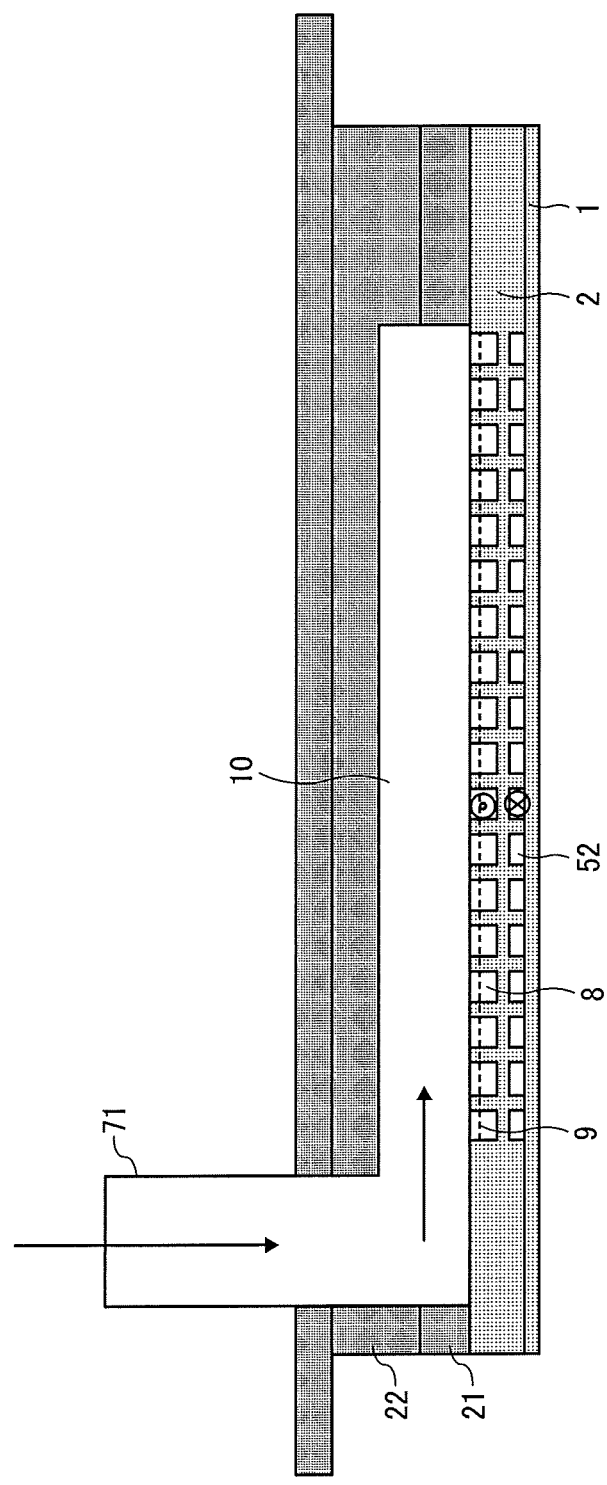
FIG. 10 is a diagram illustrating the circulation of ink in the ink discharging head.

Next, the ink circulation in the ink discharging head is described. As illustrated in FIG. 3, the supply port 71 communicating with the common liquid chamber and the circulation port 81 communicating with the circulation common liquid chamber 50 are formed at ends of the common liquid chamber member 20. The supply port 71 and the circulation port 81 are connected with the supply tank and the circulation tank (FIGS. 10 and 11) to store the ink via respective tubes. The ink stored in the supply tank is supplied to the individual liquid chamber 6 via the supply port 71, the common liquid chamber 10, the liquid introducing portion 8, and the fluid resistance 7.

Moreover, while the piezoelectric member 12 is driven to discharge the ink in the individual liquid chamber 6 from the nozzle 4, the entire or the part of the ink accumulated in the individual liquid chamber 6 without being discharged circulates to the circulation tank via the fluid resistance 51, the circulation flow paths 52 and 53, the circulation common liquid chamber 50, and the circulation port 81.

The ink can be circulated during both operation and non-operation of the ink discharging head. Due to this ink circulation downtime, the ink in the individual liquid chamber is always refreshed. Also, agglomeration and settling-down of the components contained in the ink can be reduced, which is preferable.

A device for forming an image with ink after applying the pre-processing fluid to a substrate will be described with reference to FIG. 12.

Figure 12:
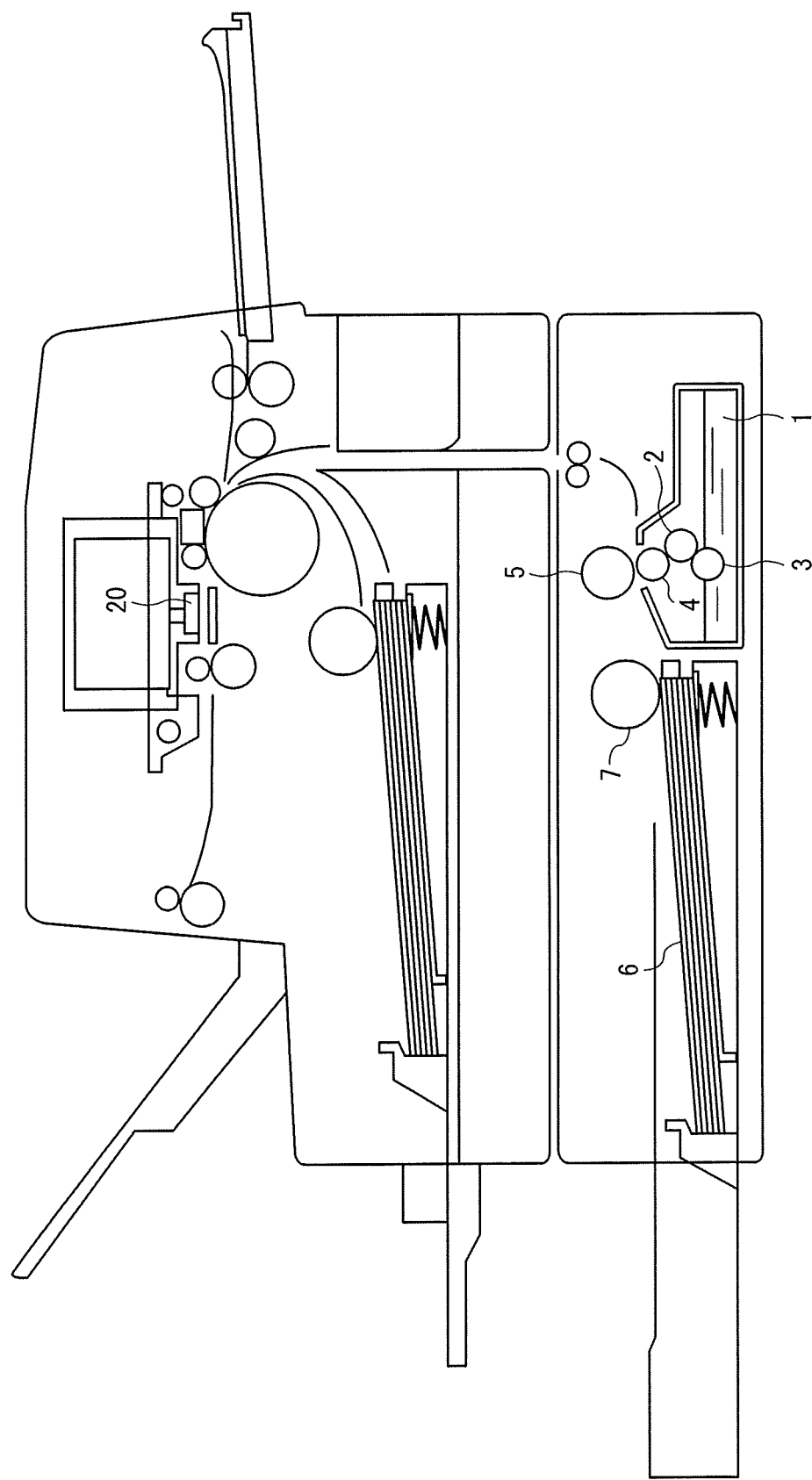
FIG. 12 is a schematic diagram illustrating an example of the image forming device.
Figure 13:
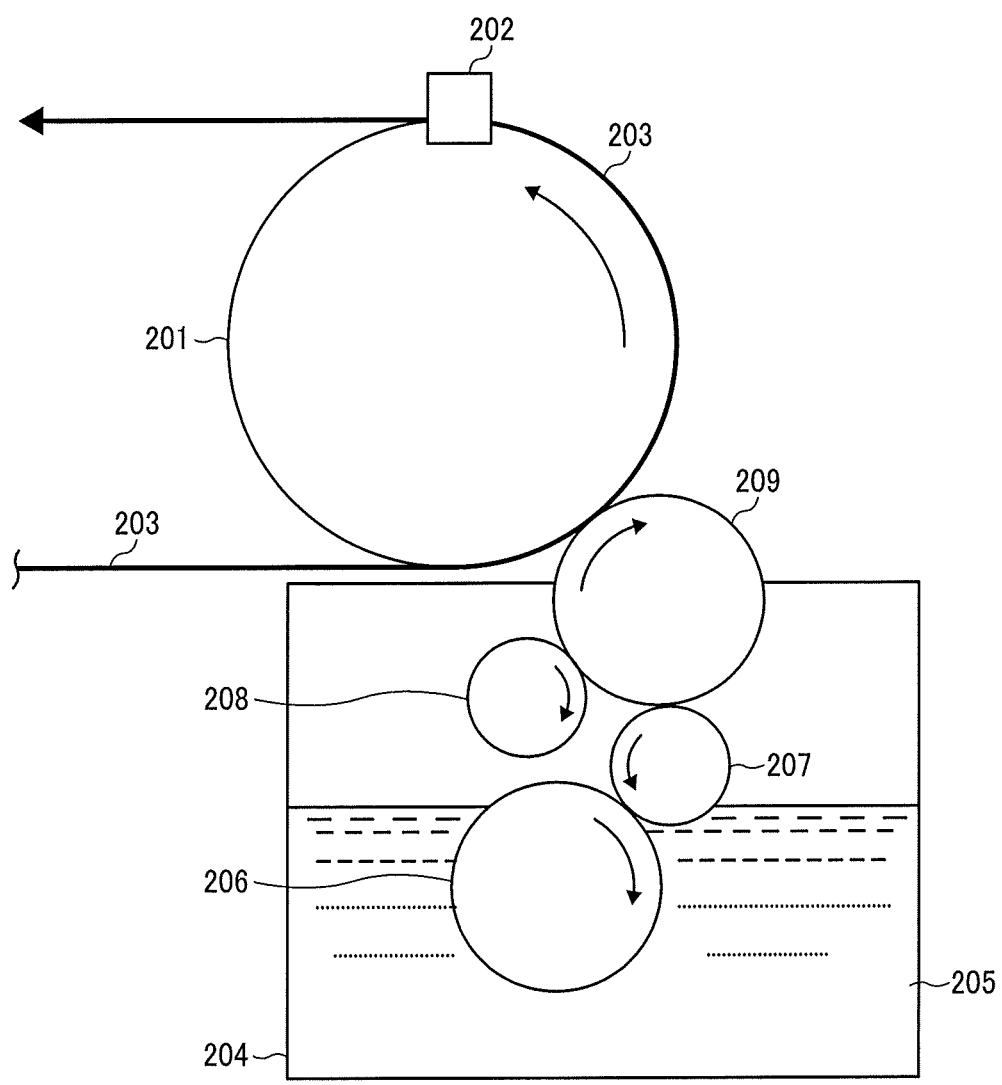
FIG. 13 is a schematic diagram illustrating a pre-processing fluid application device of the pre-processing unit illustrated in FIG. 12.

FIG. 12 is a diagram illustrating an example of a recording device which forms images by scanning an inkjet recording head.

In the device illustrated in FIG. 12, a substrate 6 is fed by a sheet-feeding roller 7 and a pre-processing fluid 1 is thinly and uniformly applied to the substrate 6 by an application roller 4 and a counter roller 5.

The pre-processing fluid 1 is drawn up by a drawing-up roller 3 and uniformly applied to the application roller 4 by a film thickness control roller 2. The substrate 6 to which the pre-processing fluid 1 has been applied is sent to a recording scan unit where an inkjet recording head 20 is located.

Figure 11:
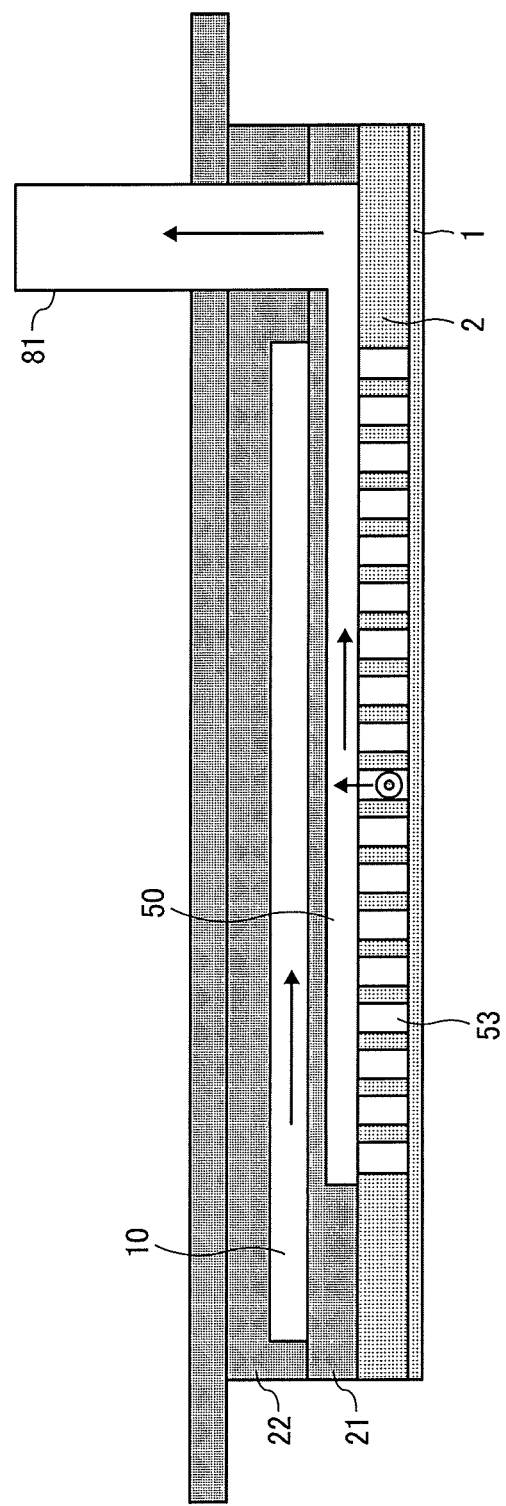
FIG. 11 is a diagram illustrating the circulation of ink in the ink discharging head.

FIG. 11 is a diagram illustrating another example of the pre-processing device. The pre-processing device stores a pre-processing fluid 205 inside a pre-processing fluid container 204.

In this unit, a thin film of the pre-processing fluid 205 is formed on the surface of an application roller 209 by a stirring and supplying roller 206, a conveying roller 207, and a thin film forming roller 208.

Thereafter, the application roller 209 is caused to rotate pressed against a rotatable counter roller 201 which is in rotation and a recording medium 203 passes between the application roller 209 and the rotatable counter roller 201. At this nip, the pre-processing fluid 205 is applied to the surface of the recording medium 203.

At this point, a pressure controller 202 adjusts the nip pressure between the counter roller 201 and the application roller 209 to control the application amount of the pre-processing fluid 205.

In addition, it is also possible to control the rotation speed of the counter roller 201 and the application roller 209 to adjust the application amount of the pre-processing fluid 205. The application roller 209 and the counter roller 201 are driven by a power supply such as drive motor. The rotation speed of the application roller 209 and the counter roller 201 can be controlled by adjusting the energy of the power supply.

If the application roller 209 applies the pre-processing fluid 205 to the recording area of the recording medium 203, the pre-processing fluid 205 having a relatively high viscosity can be thinly applied to the recording medium 203 to further reduce occurrence of uneven coloring.

The application method in the pre-processing unit is not limited to the roll coating method. Other specific methods are, for example, blade coating method, gravure coating method, gravure offset coating method, bar code method, and roll coating method.

The pre-processing fluid 205 can be applied to the entire recording area of the recording medium 203 or only the area to which an image is formed.

After the recording medium 203 is dried, an image is formed thereon by the inkjet recording unit 304 in accordance with image data.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples and Comparative Examples but are not limited thereto. In Examples, parts means parts by mass and percent means percent by mass excluding those in the evaluation criteria.

Preparation of Resin A
Preparation of Polyester-based Urethane Resin Emulsion A 1,500 g of polyester polyol (POLILIGHT OD-X-2420, manufactured by DIC Corporation), 220 g of 2,2-dimethylol propionic acid (DMPA), and 1,347 g of N-methyl pyrolidone (NMP) were charged in a reaction container equipped with a stirrer, a reflux cooling tube, and a thermometer in a nitrogen atmosphere followed by heating to 60 degrees C. to dissolve DMPA. Thereafter, 1,445 g of 4,4'-dicyclohexyl methane diisocyanate and 2.6 g of dibutyl tin dilaurylate (catalyst) were added thereto and the resultant was heated to 90 degrees C. to complete urethanification reaction in five hours. As a result, a urethane prepolymer having an isocyanate group at its distal end was obtained. This reaction mixture was cooled down to 80 degrees C. and 149 g of triethyl amine was admixed therewith. 4,340 g of the resultant mixture was extracted and charged in a liquid mixture of 5,400 g of water and 15 g of triethyl amine under vigorous stirring. Next, 1,500 g of ice was charged and thereafter 626 g an aqueous solution of 35 percent by mass 2-methyl-1,5-pentane diamine was added to conduct a chain elongation reaction. The solvent was distilled away in such a manner that the solid concentration was 30 percent by mass to obtain a resin emulsion.

Thereafter, the thus-obtained resin emulsion was subjected to dispersion with a paint conditioner (speed adjustable in the range of from 50 to 1,425 rpm, manufactured by Red Devil, Inc.) to obtain a polyester-based urethane resin emulsion A having a solid concentration of 40.0 percent by mass and a glass transition temperature of 10 degrees C.

Preparation of Polycarbonate-based Urethane Resin Emulsion B 287.9 parts of crystalline polycarbonate diol (DURANOL™ T6002, manufactured by Asahi Kasei Corporation) having an Mn of 2,000, 3.6 parts of 1,4-butane diol, 8.9 parts of DMPA, 98.3 parts of hydrogenated MDI, and 326.2 parts of acetone were charged in a simple pressurizing reactor equipped with a stirrer and a heater while introducing nitrogen.

Thereafter, the system was heated to 90 degrees C. to conduct urethanification reaction in 8 hours to manufacture a prepolymer. The reaction mixture was cooled down to 40 degrees C., 6.8 parts of triethylamine was admixed therewith and moreover, 568.8 parts of water was added. The resultant was emulsified by a mechanical emulsifier of a rotor-stator method to obtain an aqueous dispersion.

To the thus-obtained aqueous dispersion under stirring, 28.1 parts of 10 percent ethylene diamine aqueous solution was added. The system was stirred at 50 degrees C. for five hours to conduct chain elongation reaction. Thereafter, acetone was removed at 65 degrees C. with a reduced pressure. Thereafter, the moisture was controlled to obtain a polycarbonate-based urethane resin emulsion B having a solid concentration of 40 percent by mass and a glass transition temperature of −20 degrees C.

Preparation of Polyether-based Urethane Resin Emulsion C 1,500 g of polyether polyol (HIFLEX D2000, manufactured by DKS Co. Ltd.), 220 g of 2,2-dimethylol propionic acid (DMPA), and 1,347 g of N-methyl pyrolidone (NMP) were charged in a reaction container equipped with a stirrer, a reflux cooling tube, and a thermometer in a nitrogen atmosphere followed by heating to 60 degrees C. to dissolve DMPA. Thereafter, 1,445 g of 4,4'-dicyclohexyl methane diisocyanate and 2.6 g of dibutyl tin dilaurylate (catalyst) were added thereto and the resultant was heated to 90 degrees C. to complete urethanification reaction in five hours. As a result, a urethane prepolymer having an isocyanate group at its distal end was obtained. This reaction mixture was cooled down to 80 degrees C. and 149 g of triethyl amine was admixed therewith. 4,340 g of the resultant mixture was extracted and charged in a liquid mixture of 5,400 g of water and 15 g of triethyl amine during vigorous stirring. Next, 1,500 g of ice was charged and thereafter 626 g of 35 percent by mass 2-methyl-1,5-pentane diamine was added to conduct a chain elongation reaction. The solvent was distilled away in such a manner that the solid concentration was 30 percent by mass to obtain a resin emulsion. Thereafter, the thus-obtained resin emulsion was subjected to dispersion with a paint conditioner (speed adjustable in the range of from 50 to 1,425 rpm, manufactured by Red Devil, Inc.) to obtain a polyether-based urethane resin emulsion C having a solid concentration of 30.0 percent by mass and a glass transition temperature of 75 degrees C.

In addition, the glass transition temperature was measured by DSC (Thermo plus EVO2/DSC, manufactured by Rigaku Corporation).

Preparation of Resin B

Preparation of Acrylic Resin Emulsion A

A mixture of 55 parts of methylmethacrylate, 41 parts of acrylic acid 2-ethylhexyl ester monomer, 2 parts of methacrylic acid, 2 parts of AQUALON HS-10 (manufactured by DKS Co. Ltd.), and 52 parts of deionized water was emulsified by a HOMOMIXER to obtain a uniform milk white emulsified liquid. Next, 89 parts of deionized water was charged in a 250 mL flask equipped with a stirrer, a thermometer, a nitrogen gas introducing tube, and a reflux tube, and the temperature was raised to 70 degrees C. while introducing nitrogen. Thereafter, 0.8 parts of aqueous solution of 10 percent AQUALON HS-10 (manufactured by DKS Co. Ltd.) and 2.6 parts of aqueous solution of 5 percent by mass ammonium persulfate were charged into the flask. Thereafter, the preliminarily prepared emulsified liquid was continuously dripped to the flask in 2.5 hours. In addition, 0.6 parts of an aqueous solution of 5 percent ammonium persulfate was added every hour until three hours passed after the dripping started. Subsequent to two-hour aging at 70 degrees C. after the dripping completed, the resultant was cooled down to adjust pH to 7 to 8 by 28 percent ammonium water to obtain an acrylic resin emulsion A. The solid content of the thus-obtained resin particle liquid dispersion was 40.1 percent. The resin particle had a glass transition temperature of the 36 degrees C. and an average particle diameter of 125 nm.

Preparation of Acrylic Resin Emulsion B

An acrylic resin emulsion B was obtained in the same manner as in the preparation of the acrylic resin emulsion A except that 69 parts of methyl methacrylate and 27 parts of acrylic acid 2-ethylhexyl ester monomer were used. The solid content of the thus-obtained resin particle liquid dispersion was 40.2 percent. The resin particle had a glass transition temperature of the 62 degrees C. and an average particle diameter of 121 nm.

Preparation of Acrylic Resin Emulsion C

As the acrylic resin emulsion C, Vinyblan 2685 (solid content of 30 percent, glass transition temperature of 50 degrees C., manufactured by Nisshin Chemical Co., Ltd.)

Preparation of Acrylic Resin Emulsion D

As the acrylic resin emulsion D, VONCOAT AN-1170 (solid content of 50 percent, glass transition temperature of 60 degrees C., manufactured by DIC Corporation) was used.

Preparation of Magenta Pigment Dispersion A

After preliminarily mixing the following recipe, the thus-obtained mixture was subject to circulation dispersion for seven hours with a disk type bead mill (KDL type, media: zirconia ball having a diameter of 0.3 mm, manufactured by SHINMARU ENTERPRISES CORPORATION) to obtain a magenta pigment dispersion A (pigment concentration of 15 percent by mass).

C.I.Pigment Red 269: 15 parts
Acrylic polymer dispersant Disperbyk-2010 (manufactured by BYK Japan KK): 5 parts
Deionized water: 80 parts Preparation of Magenta Pigment Dispersion B After preliminarily mixing the following recipe, the thus-obtained mixture was subject to circulation dispersion for seven hours with a disk type bead mill (KDL type, media: zirconia ball having a diameter of 0.3 mm, manufactured by SHINMARU ENTERPRISES CORPORATION) to obtain a magenta pigment dispersion B (pigment concentration of 15 percent by mass).

C.I.Pigment Red 202: C.I.Pigment Violet 19=80: 20 solid solution pigment: . . . 15 parts
Acrylic polymer dispersant Disperbyk-2010 (manufactured by BYK Japan KK): 5 parts
Deionized water: 80 parts Preparation of Magenta Pigment Dispersion C After preliminarily mixing the following recipe, the thus-obtained mixture was subject to circulation dispersion for seven hours with a disk type bead mill (KDL type, media: zirconia ball having a diameter of 0.3 mm, manufactured by SHINMARU ENTERPRISES CORPORATION) to obtain a magenta pigment dispersion C (pigment concentration of 15 percent by mass).

C.I.Pigment Red 122: 15 parts
Acrylic polymer dispersant Disperbyk-2010 (manufactured by BYK Japan KK): 5 parts
Deionized water: 80 parts Preparation Method of Pre-Processing Fluid Preparation Method of Pre-Processing Fluid 1

Pre-processing fluid 1 was obtained by prescribing the following recipe followed by mixing and stirring and filtration by a filter having a pore diameter of 5 μm (Minisart®, manufactured by Sartorius Stedim Biotech GmbH).

Sodium chloride: 1.17 parts
Polyester-based urethane resin emulsion A: 10 parts (as solid content)
Fluorochemical surfactant: (FS-300, manufactured by E. I. du Pont de Nemours and Company): 1 part
PROXEL LV (asepticus, available from Avecia): 0.1 parts
1,2-propane diol: 10 parts
Deionized water: 77.73 parts Preparation Method of Pre-Processing Fluids 2 to 9

Pre-processing fluids 2 to 9 were prepared in the same manner as for Pre-processing fluid 1 according to the prescriptions shown in Table 1.

TABLE 1

|  |  | Glass transition temperature of resin A | Pre-processing fluid 1 | Pre-processing fluid 2 | Pre-processing fluid 3 | Pre-processing fluid 4 | Pre-processing fluid 5 |
|---|---|---|---|---|---|---|---|
| Metal salt | Sodium chloride |  | — | 1.17 |  |  |  |

TABLE 1-continued

|  |  | Glass transition temperature of resin A | Pre-processing fluid 2 | Pre-processing fluid 3 | Pre-processing fluid 4 | Pre-processing fluid 5 |
|---|---|---|---|---|---|---|
| Metal salt | Barium acetate | — |  | 2.55 |  |  |
|  | Calcium acetate monohydrate | — |  |  | 1.76 | 1.76 |
|  | Magnesium sulfate | — |  | 1.20 |  |  |
| Resin A | Polyester-based urethane resin emulsion A (solid content) | 10 degrees C. | 10.00 | 10.00 | 10.00 | 10.00 |
|  | Polycarbonate urethane resin emulsion B (solid content) | −20 degrees C. |  |  |  | 10.00 |
|  | Polyether-based urethane resin emulsion C (solid content) | 75 degrees C. |  |  |  |  |
| Surfactant | FS-300 | — | 1.00 | 1.00 | 1.00 | 1.00 |
| Fungicides | PROXEL LV | — | 0.10 | 0.10 | 0.10 | 0.10 |
| Organic solvent | 1,2-propanediol | — | 10.00 | 10.00 | 10.00 | 10.00 |
| Water | Deionized water | — | Balance | Balance | Balance | Balance |
| Total (Percent by mass) |  |  | 100.00 | 100.00 | 100.00 | 100.00 |

|  |  | Glass transition temperature of resin A | Pre-processing fluid 6 | Pre-processing fluid 7 | Pre-processing fluid 8 | Pre-processing fluid 9 |
|---|---|---|---|---|---|---|
| Metal salt | Sodium chloride | — |  |  | 1.17 | 1.17 |
|  | Barium acetate | — |  |  |  |  |
|  | Calcium acetate monohydrate | — |  |  |  |  |
|  | Magnesium sulfate | — | 1.20 |  |  |  |
| Resin A | Polyester-based urethane resin emulsion A (solid content) | 10 degrees C. |  | 10.00 |  |  |
|  | Polycarbonate urethane resin emulsion B (solid content) | −20 degrees C. | 10.00 |  |  |  |
|  | Polyether-based urethane resin emulsion C (solid content) | 75 degrees C. |  |  |  | 10.00 |
| Surfactant | FS-300 | — | 1.00 | 1.00 | 1.00 | 1.00 |
| Fungicides | PROXEL LV | — | 0.10 | 0.10 | 0.10 | 0.10 |
| Organic solvent | 1,2-propanediol | — | 10.00 | 10.00 | 10.00 | 10.00 |
| Water | Deionized water | — | Balance | Balance | Balance | Balance |
| Total (Percent by mass) |  |  | 100.00 | 100.00 | 100.00 | 100.00 |

Preparation Method of Magenta Ink 1

The following recipe was mixed and stirred followed by filtration by a polypropylene filter having an average pore diameter of 0.2 μm to obtain Magenta ink 1.

Magenta pigment dispersion A: 6.5 parts (solid content)

Acrylic resin emulsion A: 7 parts (solid content)

Fluorochemical surfactant: (FS-300, manufactured by E.I. du Pont de Nemours and Company): 1 part PROXEL LV (asepticus, available from Avecia): 0.1 parts 1,2-propane diol: 25 parts Diethylene glycol monobutyl ether: 5 parts Deionized water: 55.4 parts Preparation Method of Magenta Inks 2 to 10

Magenta inks 2 to 10 were prepared in the same manner as for Magenta ink 1 according to the prescriptions shown in Table 2.

TABLE 2

| | | Glass transition temperature of resin B | Magenta ink 1 | Magenta ink 2 | Magenta ink 3 | Magenta ink 4 | Magenta ink 5 |
|---|---|---|---|---|---|---|---|
| Pigment dispersion | Magenta pigment dispersion A (solid content) | — | 6.5 | 3 | 3 | 3 | 3 |
| | Magenta pigment dispersion B (solid content) | — | | | | | |
| | Magenta pigment dispersion C (solid content) | — | | | | | |
| Resin B | Acrylic resin emulsion A (solid content) | 36 degrees C. | 7 | 7 | | | |
| | Acrylic resin emulsion B (solid content) | 62 degrees C. | | | 7 | | |
| | Acrylic resin emulsion C (solid content) | 50 degrees C. | | | | 7 | |
| | Acrylic resin emulsion D (solid content) | 60 degrees C. | | | | | 7 |
| Surfactant | FS-300 | — | 1 | 1 | 1 | 1 | 1 |
| Fungicides | PROXEL LV | — | 0.1 | 0.1 | 0.1 | 0.1 | 0.1 |
| Organic solvent | 1,2-propanediol | — | 25 | 25 | 25 | 25 | 25 |
| | Diethylene glycol monobutylether | — | 5 | 5 | 5 | 5 | 5 |
| Water | Deionized water | — | Balance | Balance | Balance | Balance | Balance |
| Total (Percent by mass) | | | 100 | 100 | 100 | 100 | 100 |

| | | Glass transition temperature of resin B | Magenta ink 6 | Magenta ink 7 | Magenta ink 8 | Magenta ink 9 | Magenta ink 10 |
|---|---|---|---|---|---|---|---|
| Pigment dispersion | Magenta pigment dispersion A (solid content) | — | | | | | 6.5 |
| | Magenta pigment dispersion B (solid content) | — | 6.5 | 3 | | | |
| | Magenta pigment dispersion C (solid content) | — | | | 6.5 | 3 | |
| Resin B | Acrylic resin emulsion A (solid content) | 36 degrees C. | 7 | 7 | 7 | 7 | |
| | Acrylic resin emulsion B (solid content) | 62 degrees C. | | | | | |
| | Acrylic resin emulsion C (solid content) | 50 degrees C. | | | | | |
| | Acrylic resin emulsion D (solid content) | 60 degrees C. | | | | | |
| Surfactant | FS-300 | — | 1 | 1 | 1 | 1 | 1 |
| Fungicides | PROXEL LV | — | 0.1 | 0.1 | 0.1 | 0.1 | 0.1 |
| Organic solvent | 1,2-propanediol | — | 25 | 25 | 25 | 25 | 25 |
| | Diethylene glycol monobutylether | — | 5 | 5 | 5 | 5 | 5 |

TABLE 2-continued

| Water | Deionized water | — | Balance | Balance | Balance | Balance | Balance |
|---|---|---|---|---|---|---|---|
| | Total (Percent by mass) | | 100 | 100 | 100 | 100 | 100 |

Image Forming Method

PET film (ESPET® E-5100, thickness of 25 μm, manufactured by TOYOBO CO., LTD.) as a non-absorptive recording medium was coated with the pre-processing fluid by a roll coater in such a manner that the attachment amount was 3 g/m². Thereafter, the non-absorptive recording medium was dried at 80 degrees C. for two minutes in a circulating oven dryer.

An ink jet printer (remodeled IPSiO GXe 5500, manufactured by Ricoh Co., Ltd.) which was filled with magenta ink was prepared and printed a solid image of 5 cm square on a recording medium coated with the pre-processing fluid followed by drying. Thereafter, the solid image was dried at 80 degrees C. for two minutes using a circulating oven dryer. Next, the properties of each printed matter produced in the above-mentioned image formation were evaluated according to the following methods and evaluation criteria. The results are shown in Table 3.

Blurring

The exudation distance of the image portion exuded to the non-printed portion of the recording medium was measured by visual observation on the end of the formed solid image to evaluate the degree of blurring according to the following criteria. The wiping member was determined as practically usable when graded C or above.

Evaluation Criteria
A: No blurring observed
B: Blurring less than 1 mm observed
C: Blurring from 1 mm to less than 3 mm observed
D: Blurring not less than 3 mm observed Coloring 10 sheets of Recopy PPC Paper Type 6200 (manufactured by Ricoh Co., Ltd.) was placed under a recording medium as a lining for color measurement. Using a colorimeter (Spectrophotometric Densitometer X-Rite 939, manufactured by X-Rite Inc.), optical density (magenta) was measured at any five places in the printed image to obtain the average value thereof to evaluate coloring according to the following criteria. It was determined as practically usable when graded B or above.

Evaluation Criteria
A: Optical density (magenta) was 2.0 or greater
B: Optical density (magenta) was from 1.5 to less than 2.0
C: Optical density (magenta) was from 1.2 to less than 1.5
D: Optical density (magenta) was less than 1.2

Blocking Resistance

Five unprinted recording media were stacked on a printed surface, held between two glass plates of 10 cm square, and left in an environment of 50 degrees C. and 50 percent RH for one hour under a load 0.5 kg/cm². Thereafter, the load was released, the recording medium stacked on top was peeled off to evaluate the degree of blocking according to the following evaluation criteria. The recording medium was determined as practically usable when graded C or above.

Evaluation Criteria
A: No blocking occurred (no screech heard when peeled off)
B: No blocking occurred (screech heard when peeled off)
C: Blocking slightly occurred (slightly transferred to adjacent substrate)
D: Blocking significantly occurred (transferred portion was clearly recognized on adjacent substrate)
E: Blocking occurred (adhered to each other and difficult to be detached)

TABLE 3

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Working solution | Pre-processing fluid | 1 | A | | | | | | | | | |
| | | 2 | | A | | | | | | | | |
| | | 3 | | | A | | | | | | | |
| | | 4 | | | | A | | | | | | |
| | | 5 | | | | | A | A | A | | A | A |
| | | 6 | | | | | | | | A | | |
| | | 7 | | | | | | | | | | |
| | | 8 | | | | | | | | | | |
| | | 9 | | | | | | | | | | |
| | Magenta ink | 1 | A | A | A | A | A | | | | | |
| | | 2 | | | | | | A | | | | |
| | | 3 | | | | | | | A | A | | |
| | | 4 | | | | | | | | | A | |
| | | 5 | | | | | | | | | | A |
| | | 6 | | | | | | | | | | |
| | | 7 | | | | | | | | | | |
| | | 8 | | | | | | | | | | |
| | | 9 | | | | | | | | | | |
| | | 10 | | | | | | | | | | |
| Evaluation | Blurring | | C | B | A | A | A | A | A | A | A | A |
| | Coloring | | A | A | A | A | A | A | A | A | A | A |
| | Blocking resistance | | C | C | C | C | B | B | A | A | A | A |

| | | | Comparative Example | | | | | | | |
|---|---|---|---|---|---|---|---|---|---|---|
| | | | 1 | 2 | 3 | 4 | 5 | 6 | 7 | 8 |
| Working solution | Pre-processing fluid | 1 | | | | A | A | | | A |
| | | 2 | | | | | | | | |
| | | 3 | | | | | | | | |
| | | 4 | | | | | | | | |
| | | 5 | | | | | | | | |
| | | 6 | | | | | | | | |
| | | 7 | A | | | | | | | |
| | | 8 | | A | | | | | | |
| | | 9 | | | A | | | | | |
| | Magenta ink | 1 | A | A | A | | | | | |
| | | 2 | | | | | | | | |
| | | 3 | | | | | | | | |
| | | 4 | | | | | | | | |
| | | 5 | | | | | | | | |
| | | 6 | | | | | A | | | |
| | | 7 | | | | | | A | | |
| | | 8 | | | | | | | A | |
| | | 9 | | | | | | | | A |
| | | 10 | | | | | | | | A |
| Evaluation | Blurring | | D | C | C | C | C | C | C | C |
| | Coloring | | B | A | A | C | D | C | D | B |
| | Blocking resistance | | D | D | D | C | C | C | C | E |

In Example 1, the pigment in the ink agglomerated by the metal salt, thereby preventing blurring in some degree. Also, with C.I.Pigment Red 269, high coloring was demonstrated to a degree that the image density was 2.0 or higher. Furthermore, the pre-processing layer contained a resin A having a relatively low glass transition temperature to form a flexible layer and the ink film contained a resin B having a glass transition temperature higher than that of the resin A to form an ink film having a high strength. Due to this combination, the ink film was less likely to be destroyed by buffering in the pre-processing layer against the pressure at the time of pressurization, thereby reducing blocking in some degree. The present inventors conducted continuous printing using an image forming device having an ink circulation system as illustrated in FIGS. 3 to 11 and confirmed that discharging was well stable over a long period of time.

In Example 2, a metal salt was changed from mono-valent to multi-valent. In Examples 3 and 4, a calcium salt and a magnesium salt were particularly selected from multi-valent metal salts. As the degree of valance of the metal salt was increased, the agglomeration force was significantly increased, thereby contributing to obtaining an image free of blurring.

In Example 5, the glass transition temperature of the resin A contained in the pre-processing fluid was set to be zero degrees or lower. This promoted the buffer effect of the pre-processing layer, thereby ameliorating blocking resistance.

In Example 6, the pigment concentration of the magenta ink was halved from 6.5 percent to 3 percent. Due to the high coloring by C.I.Pigment Red 269 itself, the image density was kept at 2.0 or greater at a low pigment concentration.

In Examples 7 to 10, the resin B in the magenta ink had a glass transition temperature of 50 degrees C. or higher, which were preferable Examples of the present disclosure. In addition to the features of Examples 1 to 6, in this embodiment, the strength of the ink film was further improved, so that the ink film was not easily lost. That is, the recording medium struck a balance between image density and blocking resistance while reducing blurring.

In Comparative Example 1, no metal salt was contained in the pre-processing fluid in comparison with Example 1. Without the agglomeration effect of the pigment on the pre-processing layer, the image blurred and the coloring deteriorated.

In addition, since the ink film had poor brittleness, which resulted in poor blocking resistance.

In Comparative Example 2, the resin A was not contained in the pre-processing fluid. Since the pre-processing layer had no buffer effect, blocking resistance was poor.

In Comparative Example 3, the glass transition temperature of the resin A in the pre-processing fluid was higher than the glass transition temperature of the resin B in the ink. In this case, the buffer action did not work and the entire image became hard and brittle, which invited poor blocking resistance.

In Comparative Examples 4 to 7, the pigment of the magenta ink therein was not C.I.Pigment Red 269. In comparison with C.I.Pigment Red 269, the image density was low. In addition, like Example 6, the image density further lowered when the pigment concentration was decreased from 6.5 percent to 3 percent, which degraded coloring.

In Comparative Example 8, the resin B was not contained in the magenta ink. The strength of the ink film was considerably reduced, which made the recording medium considerably weak to blocking, resulting in poor blocking resistance.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming method comprising:
coating a non-absorptive recording medium with a pre-processing fluid comprising a metal salt and a resin A; and
applying a magenta ink to the non-absorptive recording medium which has been coated with the pre-processing fluid,
wherein the magenta ink comprises a resin B having a glass transition temperature higher than a glass transition temperature of the resin A and C.I.Pigment Red 269 represented by the following Chemical formula 1:

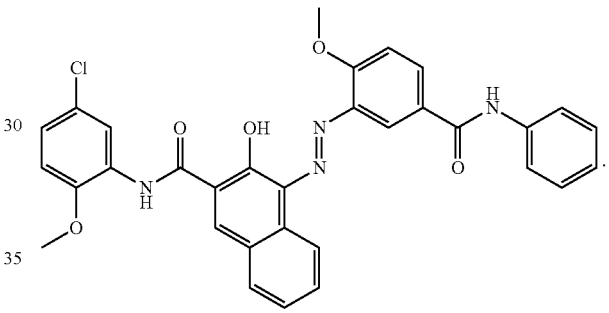

Chemical formula 1

2. The image forming method according to claim 1, wherein the metal salt is a multi-valent metal salt.

3. The image forming method according to claim 2, wherein the multi-valent metal salt comprises a calcium salt or a magnesium salt.

4. The image forming method according to claim 1, wherein the glass transition temperature of the resin A is 0 degrees C. or lower.

5. The image forming method according to claim 1, wherein a proportion of C.I.Pigment Red 269 in the magenta ink is 6 percent by mass or less.

6. The image forming method according to claim 1, wherein the glass transition temperature of the resin B is 50 degrees C. or higher.

7. An image forming device comprising:
a coating device configured to coat a non-absorptive recording medium with a pre-processing fluid comprising a metal salt and a resin A; and
an ink discharging head configured to discharge a magenta ink to the non-absorptive recording medium which has been coated with the pre-processing fluid,
wherein the magenta ink comprises a resin B having a glass transition temperature higher than a glass transition temperature of the resin A and C.I.Pigment Red 269 represented by the following Chemical formula 1:

Chemical formula 1

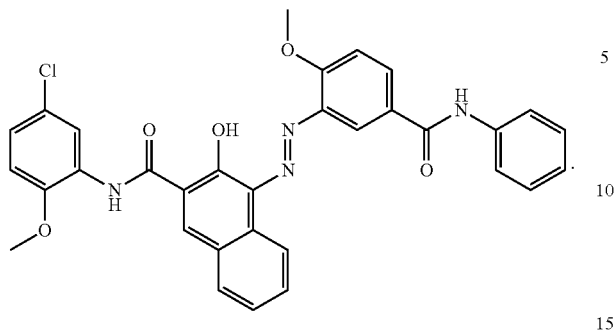

8. The image forming device according to claim 7,
wherein the ink discharging head comprises a nozzle through which the magenta ink is discharged, an individual liquid chamber communicating with the nozzle, a common liquid chamber configured to supply the magenta ink to the individual liquid chamber, a circulation flow path communicating with the individual liquid chamber, a circulation common liquid chamber communicating with the circulation flow path, and a pressure generating device configured to apply a pressure to the magenta ink in the individual liquid chamber.

* * * * *